United States Patent [19]
Shimizu et al.

[11] Patent Number: 5,653,944
[45] Date of Patent: Aug. 5, 1997

[54] SLURRY FILTRATION DEVICE AND FLUE-GAS DESULFURIZATION SYSTEM

[75] Inventors: Taku Shimizu; Koichiro Iwashita; Yoshikazu Endo, all of Tokyo; Masakazu Onizuka; Toru Takashina, both of Hiroshima, all of Japan

[73] Assignee: Mitsubishi Jukogyo Kabushiki Kaisha, Tokyo, Japan

[21] Appl. No.: 587,501

[22] Filed: Jan. 17, 1996

[30] Foreign Application Priority Data

May 10, 1995 [JP] Japan .................. 7-112057

[51] Int. Cl.$^6$ .................. B01D 50/00; B01D 24/00; B01D 53/02
[52] U.S. Cl. .................. 422/168; 422/172; 210/284; 210/290; 210/297; 210/388; 210/785; 95/55; 96/136; 423/243.08; 423/244.08
[58] Field of Search .................. 210/284, 290, 210/297, 388, 785; 422/168, 172; 95/55; 96/136; 423/244.08, 242, 243.08

[56] References Cited

U.S. PATENT DOCUMENTS

| | | | |
|---|---|---|---|
| 623,439 | 4/1899 | Suman | 210/284 |
| 773,946 | 11/1904 | Langill | 210/284 |
| 2,072,848 | 3/1937 | Brown | 210/284 |
| 2,093,370 | 9/1937 | Sebring | 210/284 |
| 3,029,950 | 4/1962 | Frasca | 210/284 |
| 3,202,286 | 8/1965 | Smit | 210/290 |
| 3,870,640 | 3/1975 | Reece | 210/388 |
| 4,048,068 | 9/1977 | Hirs | 210/28 |
| 4,073,729 | 2/1978 | Kraemer et al. | 210/284 |
| 4,487,784 | 12/1984 | Kuroda et al. | 423/55 |
| 4,632,810 | 12/1986 | Shinoda et al. | |
| 4,765,892 | 8/1988 | Hulbert et al. | 210/290 |
| 5,084,176 | 1/1992 | Davis et al. | 210/350 |
| 5,132,027 | 7/1992 | Ukawa et al. | 210/787 |
| 5,176,826 | 1/1993 | Rosaen | 210/232 |
| 5,192,518 | 3/1993 | Ukawa et al. | 423/244.08 |
| 5,238,560 | 8/1993 | Lange | 210/265 |
| 5,270,015 | 12/1993 | Rochelle et al. | 422/168 |

FOREIGN PATENT DOCUMENTS 1-94909  4/1989  Japan .

*Primary Examiner*—Nina Bhat
*Attorney, Agent, or Firm*—Michael N. Meller

[57] ABSTRACT

This invention is related to a slurry filtration device and the wet lime-gypsum flue-gas desulfurization system comprising a slurry filtration device for the separation (concentration) of gypsum. The slurry filtration device comprises tank that has a slurry supply pipe at its upper part and a filtrate-drain hole at its bottom, a layer of filter sand lying on its bottom, a slurry accumulator arranged on the layer of filter sand, and a vibrator set in said slurry accumulator for vibrating the slurry. The present invention not only improves the solid-liquid separability remarkably but also saves cost and space.

17 Claims, 3 Drawing Sheets

SLURRY FILTRATION DEVICE AND FLUE-GAS DESULFURIZATION SYSTEM

BACKGROUND OF THE INVENTION

1. Field of the invention

This invention relates to a slurry filtration device for separation of slurry into a solid portion and filtrate by filtrating the slurry, and a wet lime-gypsum flue-gas desulfurization system with such a slurry filtration device.

2. Description of the related art

One of the examples of the slurry filtration methods used conventionally for separation of slurry into a solid portion and filtrate is the method of contacting flue gas containing sulfur dioxide with an absorption solution having lime or the like as an absorbent that absorbs the sulfur dioxide so as to recover gypsum. The way to concentrate and separate the gypsum slurry in the wet limestone-gypsum flue-gas desulfurization system (referred simply as "flue-gas desulfurization system" below) is explained below.

This type of the flue-gas desulfurization system produces a slurry having about 20–30 wt% gypsum in an absorption tower and the like. The gypsum (fine particles with an average particle size of about 40 µm) in this slurry is separated from the liquid (absorption solution and water having dissolved salts) in the slurry. The former is collected as a byproduct and most of the latter is returned to the absorption tower again.

It is targeted that the water content of the gypsum is kept about 20 wt % or less in the advantage of handling, because the gypsum having a water content of 22 wt % becomes liquid-like after receiving vibration, which makes it difficult to handle the gypsum during loading or bucketing. The gypsum having a water content of 20 wt % or less does not cause this problem.

A conventional flue-gas desulfurization system carries out the concentration of the slurry and dehydration of gypsum combining a slurry concentration tank called a gypsum thickener and a centrifuge. The gypsum thickener is a kind of precipitation tank for separation (gravity separation using the difference of specific gravities) of concentrated slurry and supernatant liquid from the slurry. Incidentally, the specific gravity is 1.0 for water and 2.32 for gypsum. The thickener concentrates the slurry to about 60 wt %. The centrifuge carries out solid-liquid separation of the slurry concentrated by the thickener using a centrifugal force. The water content of the gypsum after the centrifuge is about 5 wt %.

More specifically, the thickener is not a mere tank but comprises a feedwell which feeds the supplied slurry into the tank so as to disperse them quietly, a rake rotating with low speed by which the gypsum precipitated at the bottom of tank is collected in the area for drawing out the slurry, and their driving mechanisms. Each part of the thickener is lined with rubber or resin, or made of corrosion-proof materials such as stainless steel for anti-corrosiveness.

The centrifuge comprises fixed outer pipe, baskets with high rotational speed and their driving mechanisms, filter cloth, and a scraping device. The outer pipe is generally lined with rubber. Although the buckets of stainless steel are used widely, ones with rubber lining may be used depending on the kinds of the liquid to be treated. The stainless wire netting covered with the weave of P.P. (polypropylene) is widely used as the filter cloth material. The scraping device, which scrapes the dehydrated gypsum off the baskets, is made of stainless steel as main material and its blade tip is made of a material with surface-hardening treatment.

The gypsum-slurry treatment system in the conventional art mentioned above has been extremely complicated and expensive. It has required a large area for installation, and brought high equipment cost. Certainly when gypsum with high purity as a byproduct is sought, such a conventional treatment system is needed. When the required quality of the gypsum is not so high, however, the conventional system is of too high grade. Hence, in the of a simple flue-gas desulfurization system whose target is not the recovery of gypsum with high quality, lowering the equipment cost is often most desirable. Further, when the flue-gas desulfurization system is to be added later to an already working power plant, the usable space is often limited and the area required for the installation of the flue-gas desulfurization system has to be cut as much as possible.

SUMMARY OF THE INVENTION

It is an object of the present invention to provide a slurry filtration device that can lower both equipment cost and area required for installment in view of the conventional art described above, and a cost-saving and space-saving flue-gas desulfurization system that comprises such a slurry filtration device and that is preferred especially as a flue-gas desulfurization system of simpler kind.

This invention relates to: (1) a slurry filtration device comprising a tank having a slurry supply pipe at its top part and a filtrate-drain hole at its bottom part, a filter sand layer lying at the bottom of the tank, a slurry accumulator above the filter sand layer, and a vibrator for vibrating the slurry set in the accumulator; and (2) a wet lime-gypsum flue gas desulfurization system that contacts the flue gas containing sulfur dioxide with the absorption liquid containing a lime-typed absorbent for absorbing the sulfur dioxide for the recovery of gypsum, comprising means for concentrating the slurry containing the produced gypsum, and said slurry filtration device as means for filtering the concentrated slurry so as to separate produced gypsum from the slurry.

Preferred embodiments of said slurry filtration device comprise one or more of the following: a sand column (a column of filter sand) that is placed in said slurry accumulator and that leads the supernatant liquid directly into the filter sand layer; a supernatant drain hole for draining the supernatant liquid at the upper part of said slurry tank; or the separation plate placed on at the top of said sand filter layer.

Further, it may comprise partition banks placed in said tank that partition said tank into plural compartments, allowing the supernatant liquid in the slurry accumulator to flow from an upstream compartment to a neighboring compartment.

The slurry is filtered through the filter sand layer in the slurry filtration device of this invention. While the solid portion remains on the layer of the filter sand, the liquid portion is drained from the filtrate-drain hole at the bottom after it passes through the layer of the filter sand. The vibration caused by the vibrator disposed in the slurry accumulator accelerates the solid-liquid separation. Hence, the treatment of the gypsum slurry with the slurry filtration device enables the water content of the gypsum to lower to about 20 wt % and yields the gypsum that is easy to handle.

It is preferable for the slurry filtration device of this invention to have either a column of the filter sand that is placed in said slurry accumulator and that leads the supernatant liquid directly into the sand layer or a supernatant drain hole that is located at the upper part of said tank and that drains the supernatant liquid. Both the column of the filter sand and the supernatant drain hole may also be used simultaneously.

The column of the filter sand may comprise a pipe made of such a material as a wire or plastic netting that lets the liquid pass easily but holds sand and sand which is packed into the pipe. The bottom of the column of the filter sand is connected to the sand in the filter sand layer. Setting the filter sand column in the slurry accumulator increases the contact area between the slurry and the sand layer (that is, an area for filtration). A portion of supernatant liquid passes through the sand column directly into the filter sand layer without passing through a layer of solid components of the slurry which accumulates and causes heavy resistance for the filtration.

The filtration rate (the rate of movement of the liquid portion) in the filter material is inversely proportional to a square of the thickness of the filter material to be passed through. The solid components that accumulate in the slurry accumulator work as a kind of filter material. When vibration is given to the solid components or solid portion by the vibrator, the liquid contained in an upper layer of the accumulated solid components oozes out in an upward direction and becomes a sort of supernatant liquid, because the filtration resistance becomes dominant over the gravitational force that pulls the liquid down and liquid tends to move upwardly looking for lower filtration resistance. Said column of the filter sand or said supernatant drain hole lets this supernatant liquid drain and accelerates the dehydration (removal of liquid) of the slurry remarkably.

The filtration is stopped for a moment when a certain amount of the solid portion is accumulated on the filter sand layer, then the accumulated solid portion is taken out of the tank by means of raking out with a basket or the like. There is a problem in this case that the amount of the filter sand decreases because it is taken out together with the solid portion, or that the quality of the solid portion lowers because of the contamination by the sand when the solid portion is used for recovering the gypsum. It is therefore preferable to place a separation plate such as a lattice plate or a wire netting over the sand layer in order to cope with this problem.

The partition banks that partition the tank into plural compartments may be installed in the tank as necessary, as found in cases where the size of the device is large. It is effective to have a structure that lets the supernatant liquid in the slurry accumulator flow over the upper edge of the partition banks from an upstream compartment to a neighboring downstream compartment. The effectiveness of filtration improves from an upstream to a downstream compartment in this case because the filtration takes place in each compartment separately. The slurry supply pipe, the filtrate-drain hole at the bottom, the vibrator, the sand column, the supernatant liquid-drain hole and others may be installed in each individual compartment.

In the slurry filtration device having these compartments, the slurry is supplied into the first compartment and the supply is stopped when the first compartment is filled with the slurry (it does not matter even if the slurry flows over the partition bank into the second compartment because the stoppage of the slurry supply is somewhat delayed). Then the solid-liquid separation takes place in the first compartment. While the solid-liquid separation takes place in the first compartment, the slurry is supplied into the second tank. Said process is shifting to the third compartment, then to the fourth compartment successively. It depends on the size of the plant how many compartments or tanks are installed. It is desirable not to install the slurry supply pipe in the final compartment, however, in order to increase the effectiveness of the filtration. A plurality of such slurry filtration devices may be arranged if necessary.

The slurry filtration device according to this invention can be used for filtration and separation of various kinds of solid-liquid mixtures. It is especially suitable for filtration of the gypsum recovered in the wet flue-gas desulfurization process.

This invention also provides a lime-gypsum flue-gas desulfurization system in which a flue gas containing sulfur dioxide is brought into contact with the absorption solution containing absorbent of lime or the like to absorb the sulfur dioxide and gypsum is produced as a byproduct, wherein the recovery process of the byproduct gypsum comprises a combination of means for concentrating the slurry containing the gypsum, and the above-discussed slurry filtration device of this invention for filtering the concentrated slurry.

The slurry is first concentrated in a primary concentration step, for example, by precipitation or by a liquid cyclone, before it reaches the slurry filtration device.

The following reactions take place in the absorption tower of the flue-gas desulfurization system using limestone (calcium carbonate) as the absorbent:

$$SO_2 + H_2O \rightarrow H^+ + HSO_3^- \qquad (1)$$

$$H^+ + HSO_3^- + 1/2 O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

$SO_2$ is thus removed from the flue-gas and $CaSO_4 \cdot 2H_2O$ (gypsum) is obtained. The limestone and water consumed during the operation of the absorption tower are supplied as necessary, and the slurry containing the produced gypsum is taken out as required, and the operation of the absorption tower continues.

The possibility of passing the produced gypsum slurry directly into the slurry filtration device without the primary concentration step mentioned above may be considered. It turns out not to be an option, however, because of the following problem. That is, as the ratio of the filtrate water against the solid portion increases, time required for filtration and dehydration increases. One has to increase the area for the filtration and decrease the thickness of the gypsum cake in order to cope with this problem and to shorten the required time. The above possibility is not an effect option.

Hence, the gypsum-slurry treatment system in accordance with the present invention is based on the combination of said primary concentration step and the slurry filtration system mentioned above.

The slurry filtration device and the flue-gas desulfurization system of this invention have the following advantages.

(1) The equipment cost is remarkably lower than the cost for conventional systems combining a thickener with a centrifuge, because the system according to the present invention comprises a tank or tanks with simple structure and inexpensive filter sand.

(2) Similarly, the required equipment space is less compared with conventional systems.

(3) The efficiency of the solid-liquid separation remarkably improves by combining a vibrator with a sand column or supernatant drain holes or others for the removal of the supernatant liquid.

(4) A cost-saving and space-saving-type flue-gas desulfurization system can be provided because the cost for the gypsum-slurry treatment system is low and its required space is also small. Hence, a simple flue-gas desulfurization system which can be suitably added to an existing system can be provided. That gives rise to industrial significance as one of solutions for the acid rain.

DETAILED DESCRIPTION OF PREFERRED EMBODIMENTS

The examples according to the present invention are explained below with reference to the drawings.

EXAMPLE 1

Figure 1A:
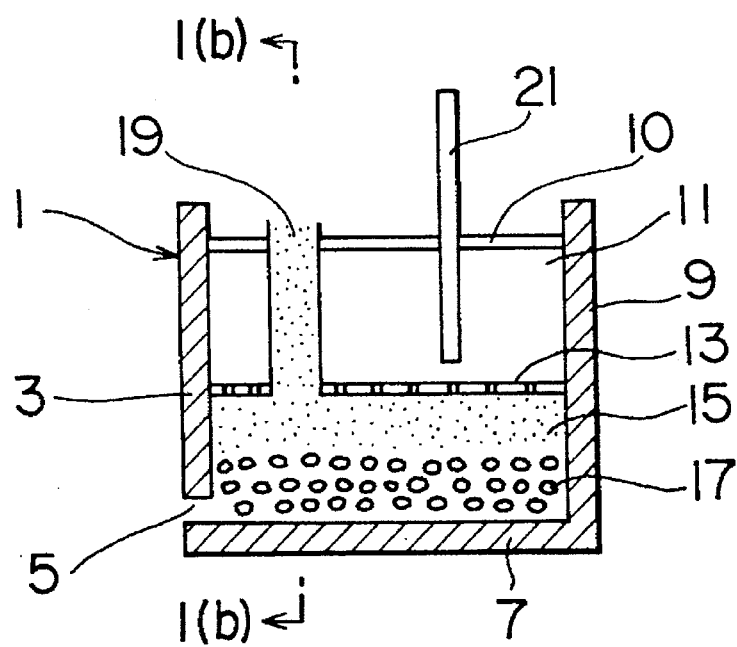
FIG. 1(a) and FIG. 1(b) are schematic illustrations of the slurry filtration device described in Example 1.
Figure 1B:
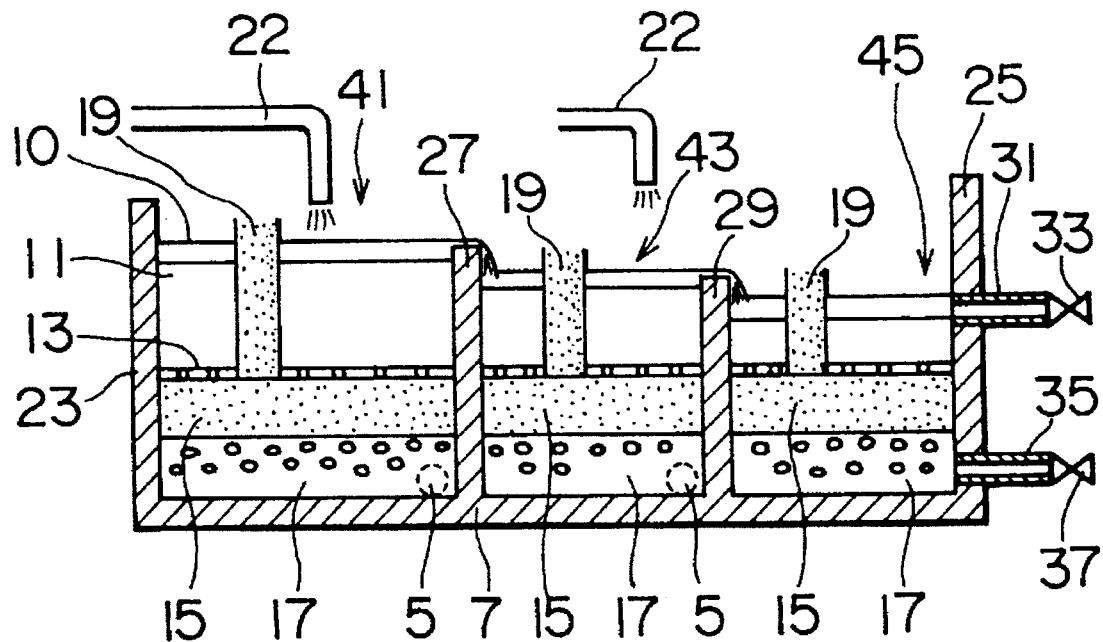

FIG. 1(a) and FIG. 1(b) are illustrations of the slurry filtration device describing an example of the present invention. FIG. 1(a) is a longitudinal cross section, and FIG. 1(b) is a (transverse) cross section at arrow-line A—A in FIG. 1(a).

The slurry filtration device 1 comprises a tank having sidewalls 3, 9 and a bottom 7, a filter sand layer comprising a sand layer 15 and a crushed stone layer 17, and a slurry accumulator 11 and others.

The tank has such a structure as a long rectangular pit. The bottom of the tank 7 and sidewalls 3, 9, 23 and 25 are made of a reinforced concrete and the like. The device of this example has partition banks 27 and 29 set in two places located in the width direction of the tank shown in FIG. 1(b). The inside of the tank is partitioned to form separate tanks called a first tank 41, a second tank 43 an, a third tank 45 from left to right. The slurry is supplied through a slurry supply pipe 22 into the center of the first tank 41. The supernatant liquid 10 at the upper part of the slurry accumulator 11 overflows from the fist tank 41 to the second tank 43 because the partition bank 27 is lower than the sidewall 23.

A filtrate-drain hole 5 through which the slurry is drained out of the tank is placed at the bottom of the (sidewall 3). The filtrate-drain hole 5 (or filtrate-drain pipe) is placed in each of tanks 41, 43 and 45.

The sidewall 25 of the third tank 45 has a supernatant drain pipe 31 at its upper part and a filtrate-drain pipe 35 at its bottom part. These pipes have the valves 33 and 37 The supernatant liquid in the upper part of the slurry accumulator is drained out of the slurry filtration device 1 through the supernatant drain pipe 31. Further, the supernatant liquid which is in the process of flowing into the third tank 45 may be drained step-wise through a drain-pipe placed between the two pipes 31 and 35. Such placement of the drain pipes makes it possible to select a suitable degree of filtration and avoids fluctuations in the degree of filtration by successively switching from a higher drain pipe to a lower pipe after prescribed time intervals. Similar drain pipes can be disposed also in first and second tanks 41 and 43.

A crushed stone layer 17 is lying at the bottom of the slurry filtration device 1. The sand layer 15 is lying on the crushed stone layer 17. The slurry filtration device of this example is designed for the filtration of the gypsum slurry obtained from the flue-gas desulfurization, and the specifications of the crushed stone layer 17 and the sand layer 15 are determined for this use.

That is, the filter sand layer comprises the crushed stone layer of 100–300 mm thickness with an average particle size of 10–30 mm for crushed stones, and the sand layer of 100–300 mm thickness with an average sand particle size 0.5–2 mm is located on the crushed stone layer. Effective filtration can be achieved in these ranges.

The separation plate 13 that comprises a lattice plate is placed on the sand layer 15. One of the examples for the lattice-like plate 13 is a steel plate with a thickness of 3 mm that is punched to form a lattice pattern of holes of 100 mm side length which are separated in equal intervals of 50 mm. When the gypsum in the accumulator 11 is taken out by a bucket and the like, the lattice-like plate prevents the bucket from entering into the sand layer 15 (filter sand layer) and keeps the sand from contaminating the gypsum in the bucket. When the gypsum is contaminated by the sand, the quality of the gypsum is lowered, and the filter sand is consumed. When it becomes necessary to change the filter sand, the latticed plate 13 can be removed before replacing the sand.

The sand column 19 stands in the slurry accumulator. While the outside shell of the sand column 19 is made of wire netting, the same sand as that of the sand layer 15 is packed inside. The lower part of the sand column 19 is connected with the sand layer 15. The upper part of the sand column 19 reaches the supernatant liquid 10 found at the top of the slurry accumulator 11. The supernatant liquid 10 enters into the sand column 19 and falls down through the sand layer 15, and through the crushed stone layer 17 to come out at the liquid-drain hole 5.

A vibrator 21 is set in the slurry accumulator 11. The vibrator 21 gives vibration to the slurry accumulator 11 and improves draining of filtrate. It is believed that the vibration given to the slurry accumulator 11 disturbs the adhesion between the solid portion and the liquid portion of the slurry and promotes the separation between them.

In the experiment for filtering the gypsum-slurry (average particle size 40 µm, gypsum 60 wt %), the water content of the gypsum after the filtration without use of the vibrator was saturated at about 22% even after a long period of time. The water content of the gypsum after the filtration with use of the vibration, however, could be rapidly lowered to about 20 %. Examples for the vibrator 21 include vibrators for giving vibration to poured concrete in the application of construction and civil engineering (multi-vibrator high frequency 48V-series, HBM30ALH or 40ZLH, frequency 12–14 kHz, manufactured by Ekusen Kabushiki Kaisha).

EXAMPLE 2

Figure 2:
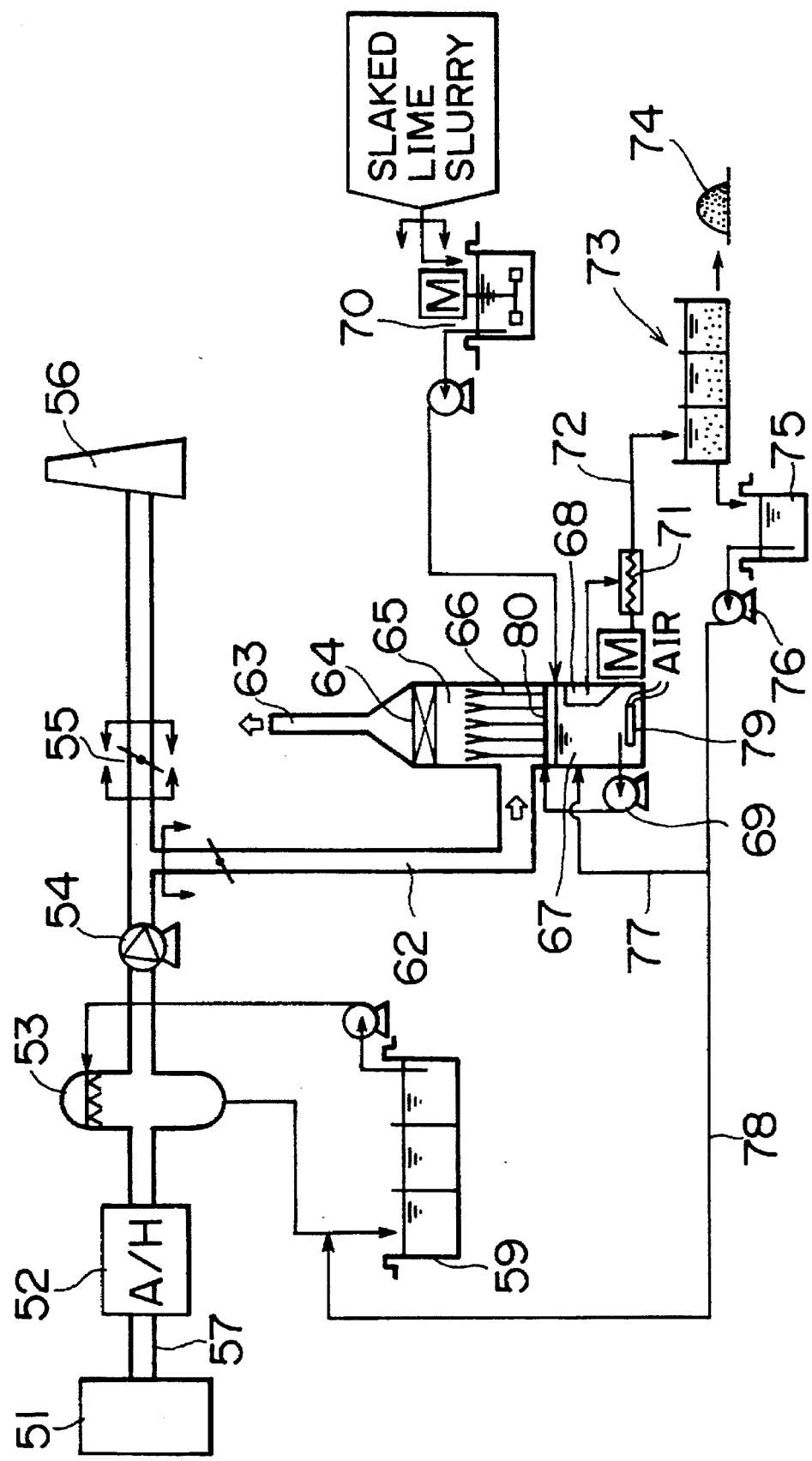
FIG. 2 is a systematic illustration of the flue-gas treatment in the power plant having the flue-gas desulfurization system described in Example 2.

Next, the flue-gas desulfurization system having the slurry filter device of this invention is explained. FIG. 2 is a systematic illustration of a flue-gas treatment system in a power plant, an example of the present invention. The flue-gas desulfurization system shown in FIG. 2 has a relatively simple structure and comprises an absorption tower combined with a chimney, and a slurry concentration tank for precipitation.

Flue gas produced at a boiler 51 (coal-fired) moves through flue 57 to a preheater 52 for combustion air where it is heat-exchanged with the combustion air. Next, the gas enters a water-screen type dust eliminator 53 where fly ash is removed out of the flue gas. An IDF (induced draft fan) 54 provides the flue gas with fluidized forces (draft). A bypass-dumper 55 is closed generally, while it is open when the flue gas is removed directly from the chimney 56 bypassing the flue-gas desulfurization system.

The flue gas generally moves through flue 62 to the absorption tower 65 of the flue-gas desulfurization system. The liquid columns 66 of absorption solution are formed in the absorption tower 65, where $SO_2$ is absorbed from the flue gas that flows up in the absorption tower. After mist is removed from the flue gas at a mist eliminator 64, the flue gas moves through a smoke stack 63 and is discharged to the atmosphere. The absorption solution gathers in an absorption-solution storage tank 67 at the bottom of the absorption tower 65. Sulfites produced by the absorption of $SO_2$ are oxidized by oxygen from the air blown through the air-blow header 79.

The main reactions that take place at the absorption tower 65 are mentioned above. The absorption solution is circulating in the absorption tower 65 and moves from the absorption-solution storage tank 67 to pump 69, then through a pipe to a nozzle header 80, and forms the liquid columns 66 of the absorption solution. The slaked lime and water which are consumed during the reactions are supplied from a slurry maker 70 to the absorption-solution storage tank 67.

The slurry concentration tank 68 is placed on a sidewall within the absorption-solution storage tank 67. The slurry is let stand still in a slurry concentration tank 68, and gypsum precipitates at the bottom of the tank 68. The precipitated and concentrated slurry has a gypsum content of about 60%. The concentrated slurry is sent by means of a screw pump 71 through a slurry pipe 72 to a slurry filtration device 73.

In this example, the slurry filtration device described in Example 1 is used. The concentrated slurry is filtered by the slurry filtration device 73 and the cake with a water content of about 20 wt % accumulated on the filter sand is discharged as gypsum 74. On the other hand, after the filtrate obtained from the slurry filtration device 73 is stored once in a filtrate pit 75, it is either returned through pipe 77 to the absorption tower 65 for recycle using pump 76, or sent to the fly-ash precipitate tank 59.

EXAMPLE 3

Figure 3:
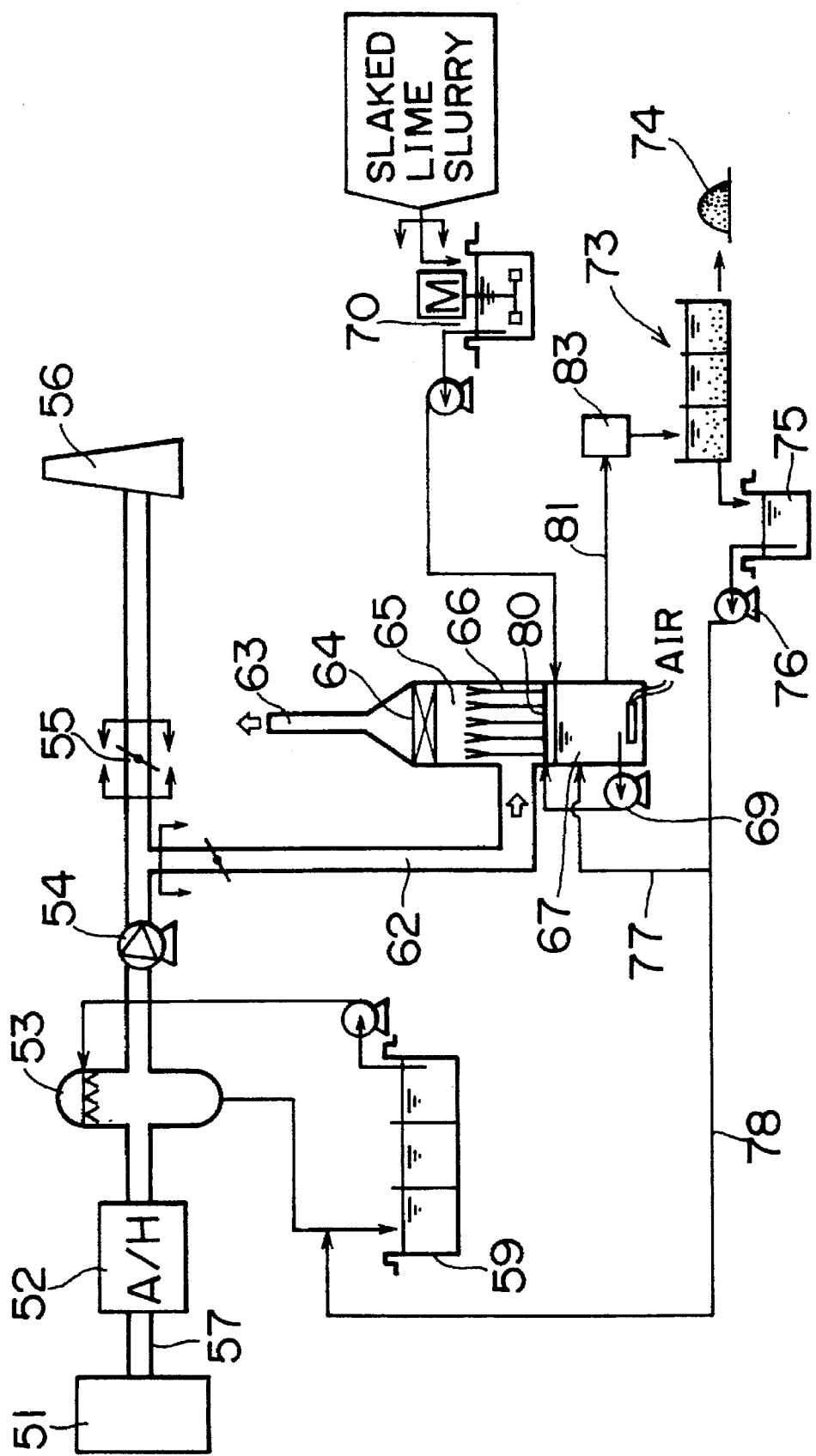
FIG. 3 is a systematic illustration of the flue-gas treatment in the power plant having the flue-gas desulfurization system described in Example 3.

FIG. 3 is a systematic illustration of a flue-gas treatment system for a power plant having a flue-gas desulfurization system as another example of this invention. The flue-gas desulfurization system in FIG. 3 is the type with a liquid cyclone. Since the same parts in FIG. 3 as those in FIG. 2 are marked with the same symbols as those in FIG. 2, the duplicated explanation is not repeated here.

The difference of the flue-gas desulfurizations between FIGS. 2 and 3 is the placement of the liquid cyclone 83 in FIG. 3 in place of the precipitation-type slurry concentration tank (symbol 68 in the FIG. 2). The gypsum slurry (with a gypsum content of about 30 wt %) in the absorption-solution storage tank 67 of the absorption tower 65 is directly drained and sent through pipe 81 to a liquid cyclone 83. After the gypsum content is increased to about 60 wt % by the liquid cyclone 83, the gypsum slurry goes through the slurry filtration device 73. This process can make the transfer of the concentrated slurry simpler, which is otherwise troublesome.

We claim:

1. A slurry filtration device comprising: a tank, a slurry supply pipe attached at an upper part thereof and a filtrate-drain hole at the bottom thereof; a layer of filter sand lying on the bottom of the tank; a slurry accumulator on the layer of filter sand; a vibrator set in the slurry accumulator for vibrating the slurry; and a sand column which is set in said slurry accumulator and which leads a supernatant liquid directly to the layer of filter sand.

2. The slurry filtration device as claimed in claim 1, further comprising a separation plate set on a top surface of said layer of filter sand.

3. The slurry filtration device as claimed in claim 1, further comprising at least one partition bank which is disposed in said tank and which partitions an inside of said tank into plural compartments, thus permitting the supernatant liquid in the slurry accumulator to flow from an upstream compartment to a neighboring downstream compartment.

4. A wet lime-gypsum flue-gas desulfurization system in which a flue gas containing sulfur dioxide is contacted with absorption solution containing lime to absorb the sulfur dioxide and recovering the thus-produced gypsum, comprising means for concentrating a slurry with the produced gypsum and the slurry filtering device as in claim 1 as means for filtering the concentrated slurry, so as to separate the produced from the slurry.

5. The wet lime-gypsum flue-gas desulfurization system as claimed in claim 4, wherein the layer of filter sand in the slurry filtration device contains a crushed stone layer with a thickness of 100–300 mm and a mean particle size of 10–30 mm for crushed stones and a sand layer with a thickness of 100–300 mm and a mean particle size of 0.5–2 mm for sand that is lying on the layer of the crushed stones.

6. The slurry filtration device as claimed in claim 1, further comprising a supernatant drain hole that is disposed in an upper part of said tank and drains a supernatant liquid.

7. The slurry filtration device as in claim 6, further comprising at least one partition bank which is disposed in said tank and which partitions an inside of said tank into plural compartments thus permitting the supernatant liquid in the slurry accumulator to flow from an upstream compartment to a neighboring downstream compartment.

8. The slurry filtration device as claimed in claim 1, further comprising a separation plate set on a top surface of said layer of filter sand.

9. The slurry filtration device as claimed in claim 1, further comprising at least one partition bank that is disposed in said tank and partitions an inside of said tank to plural compartments, making the supernatant liquid in the slurry accumulator flow from an upstream compartment to a neighboring downstream compartment.

10. A wet lime-gypsum flue-gas desulfurization system in which a flue gas containing sulfur dioxide is contacted with adsorption solution containing lime and/or the like to adsorb the sulfur dioxide and a produced gypsum is recovered, comprising means for concentrating a slurry with the produced gypsum and the slurry filtration device defined in claim 1 as means for filtrating the concentrating slurry, so as to separate the produced gypsum from the slurry.

11. The wet lime-gypsum flue-gas desulfurization system as claimed in claim 10, wherein the layer of filter sand in the slurry filtration device contains a crushed stone layer with a thickness of 100–300 mm and a mean particle size of 10–30 mm for crushed stones and a sand layer with a thickness of 100–300 mm and a mean particle size of 0.5–2 mm for sand that is lying on the layer of the crushed stones.

12. A slurry filtration device comprising: a tank, a slurry supply pipe attached at an upper part thereof and a filtrate-drain hole at the bottom thereof; a layer of filter sand lying on the bottom of the tank; a slurry accumulator on the layer of filter sand; a vibrator set in the slurry accumulator for vibrating the slurry; and further comprising a supernatant drain hole that is disposed in an upper part of said tank and drains a supernatant liquid.

13. The slurry filtration device as claimed in claim 12, further comprising a separation plate set on a top surface of said layer of filter sand.

14. The slurry filtration device as claimed in claim 13, further comprising at least one partition bank which is disposed in said tank and which partitions an inside of said tank into plural compartments, thus permitting the supernatant liquid in the slurry accumulator to flow from an upstream compartment to a neighboring downstream compartment.

15. A wet lime-gypsum flue-gas desulfurization system in which a flue gas containing sulfur dioxide is contacted with an absorption solution containing lime to absorb the sulfur dioxide and recovering the thus produced gypsum, comprising means for concentrating a slurry with the produced gypsum and the slurry filtration device as in claim 14 for filtering the concentrated slurry, so as to separate the produced gypsum from the slurry.

16. The wet lime-gypsum flue-gas desulfurization system as claimed in claim 15, wherein the layer of filter sand in the slurry filtration device contains a crushed stone layer with a thickness of 100–300 mm and a mean particle size of 10–30 mm for crushed stones and a sand layer with a thickness of 100–300 mm and a mean particle size of 0.5–2 mm for sand that is lying on the layer of the crushed stones.

17. The slurry filtration device as claimed in claim 12, further comprising at least one partition bank which is disposed in said tank and which partitions an inside of said tank into plural compartments, thus permitting the supernatant liquid in the slurry accumulator to flow from an upstream compartment to a neighboring downstream compartment.

* * * * *